US006334359B1

United States Patent
Suetake

(10) Patent No.: US 6,334,359 B1
(45) Date of Patent: Jan. 1, 2002

(54) THERMAL-TYPE FLOWMETER FOR DETECTING FLOW RATE OF FLUID

(75) Inventor: Naruki Suetake, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/182,213

(22) Filed: Oct. 30, 1998

(30) Foreign Application Priority Data

May 22, 1998 (JP) .......................................... 10-141824

(51) Int. Cl.[7] ................................................ G01F 1/68
(52) U.S. Cl. .................................................. 73/204.14
(58) Field of Search ........................ 73/204.11, 204.14; 327/66; 326/23, 33

(56) References Cited

U.S. PATENT DOCUMENTS

| | | | | |
|---|---|---|---|---|
| 4,306,453 A | * | 12/1981 | Wolfshorndl | 73/204.15 |
| 4,677,850 A | * | 7/1987 | Miura et al. | 73/204.15 |
| 4,697,099 A | * | 9/1987 | Bonaccio | 327/66 |
| 4,934,188 A | * | 6/1990 | Tanimoto et al. | 73/204.15 |
| 4,970,413 A | * | 11/1990 | Eden et al. | 326/23 |
| 5,087,834 A | * | 2/1992 | Tsay | 326/33 |
| 5,276,362 A | * | 1/1994 | Obregon et al. | 326/65 |
| 5,423,210 A | * | 6/1995 | Uchiyama | 73/204.15 |
| 5,508,491 A | * | 4/1996 | Sherman | 73/204.15 |
| 5,661,754 A | * | 8/1997 | Mapleston | 375/239 |
| 6,205,854 B1 | * | 3/2001 | Tohyama et al. | 73/204.15 |

FOREIGN PATENT DOCUMENTS

JP        2-216420        8/1990

* cited by examiner

*Primary Examiner*—Harshad Patel
(74) *Attorney, Agent, or Firm*—Sughrue Mion, PLLC

(57) ABSTRACT

A thermal-type flowmeter for detecting a flow rate of a fluid such as intake air flow rate in an internal combustion engine includes a voltage converting circuit for converting a flow-rate indicating voltage signal outputted from a flow-rate detecting sensor element into a voltage of a level falling within a predetermined range, a voltage-to-current converting circuit for converting the voltage into a current of magnitude which is proportional to a value of the flow-rate indicating voltage signal, a current-to-voltage converting circuit for converting the current mentioned above into a voltage signal for analogue-to-digital conversion, and a voltage adjusting circuit for increasing or decreasing the output voltage level of the voltage converting circuit in dependence on the value of the flow-rate indicating voltage signal. The voltage of a current source for the voltage-to-current converting circuit can be regulated so as to conform with the input voltage. The voltage-to-current converting circuit can be realized inexpensively by imparting a gain adjusting function thereto.

8 Claims, 10 Drawing Sheets

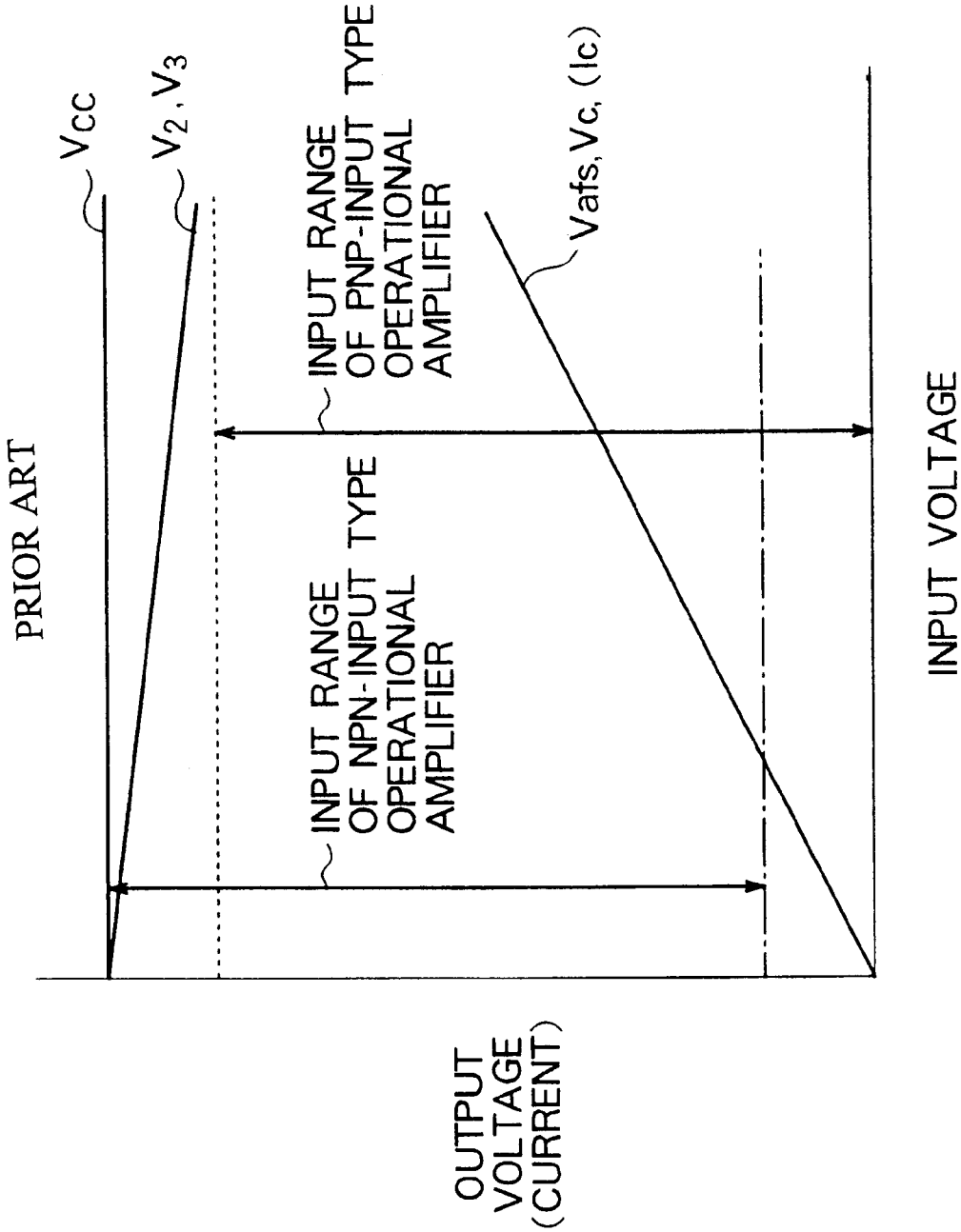

THERMAL-TYPE FLOWMETER FOR DETECTING FLOW RATE OF FLUID

BACKGROUND OF THE INVENTION

1. Field of the Invention

The present invention relates generally to a thermal-type flowmeter for detecting a flow rate of a fluid by using heat-sensitive resistors. More particularly, the present invention is concerned with a signal conditioning interface circuit for a thermal-type flowmeter adapted for detecting a flow rate of intake air in an internal combustion engine, which circuit is designed for processing an output signal of a heat-sensitive flow sensor of the thermal-type flowmeter to thereby derive a detection voltage signal which indicates the flow rate and which is to undergo analogue-to-digital conversion for generating a digital signal to be supplied to an electronic control unit for the purpose of controlling fuel injection or other operation in the internal combustion engine.

2. Description of Related Art

In the thermal-type flowmeter designed for outputting a current indicating a flow rate of a fluid such as intake air in an internal combustion engine, it is known that the intake air flow signal outputted from the sensor is converted into a voltage signal for analogue-to-digital conversion by transmitting the intake air flow signal in the form of a current signal to a circuit stage preceding to an analogue-to-digital converter so that the flow rate information can be transmitted with high fidelity or reliability even if potential variation takes place in the thermal-type flowmeter and/or the electronic control unit such as the electronic fuel injection control unit.

For having better understanding of the invention, description will first be made of a conventional thermal-type flowmeter known heretofore by reference to FIG. 8 to FIG. 10, in which FIG. 8 is a circuit diagram showing a circuit configuration of a conventional thermal-type flowmeter disclosed, for example, in a Japanese Unexamined Patent Application Publication No. 216420/1990 (JP-A-2-216420), FIG. 9 is a circuit diagram showing another conventional thermal-type flowmeter, and FIG. 10 is a view for illustrating graphically input-versus-output characteristics of the thermal-type flowmeter shown in FIG. 9.

Now referring to FIG. 8, a conventional thermal-type flowmeter denoted generally by reference numeral 1 includes an operational amplifier 1b having a non-inverting input terminal (+) to which applied is a flow-rate indicating voltage signal $V_{afs}$ outputted from an amplifier 1a constituting an output part of an air flow sensor (not shown) installed, for example, in an intake pipe of an internal combustion engine (not shown either). On the other hand, the output terminal of the operational amplifier 1b is connected to a base electrode of a transistor 1c while an inverting input terminal (−) of the operational amplifier 1b is connected an emitter electrode of the NPN-transistor 1c and one end of a reference resistor $R_e$ having the other end connected to a potential source of negative polarity. The collector of the transistor 1c is connected to a terminal of a reference voltage $V_{ref}$ in a fuel injection control unit 2 by way of a current detecting resistor $R_c$. Further, an analogue-to-digital converter (hereinafter also referred to as the A/D converter in short) incorporated in the fuel injection control unit 2 has an analogue input terminal to which the reference voltage $V_{ref}$ is applied by way of a current detecting resistor $R_c$.

In operation, when the flow-rate indicating voltage signal $V_{afs}$ is inputted to the non-inverting input terminal (+) of the operational amplifier 1b from the amplifier 1a, a base current $I_b$ flows to the base of the NPN-transistor 1c from the output terminal of the operational amplifier 1b. In that case, an emitter current $I_e$ flows through the reference resistor $R_e$, generating an emitter voltage $V_e$ which is fed back to the inverting input terminal of the operational amplifier 1b. As a result of this, the emitter voltage $V_e$ becomes equal to the voltage level of the flow-rate voltage signal $V_{afs}$.

In this conjunction, it should be mentioned that the emitter current $I_e$ may be regarded as being equal to the collector current $I_c$ so far as the current amplification factor of the NPN-transistor 1c is selected at a sufficiently large value. Accordingly, the input voltage $V_c$ which is applied to the analogue input terminal of the analogue-to-digital converter and which is given by $$V_c = V_{ref} - R_c \cdot I_c$$

can be regarded as bearing a proportional relation to the flow-rate indicating voltage signal $V_{afs}$.

Because the flow-rate indicating voltage signal $V_{afs}$ is outputted after having been converted into the collector current $I_c$, the intake air flow signal indicating a flow rate of the intake air can be converted into an electric signal to be transmitted to the A/D converter with high fidelity without being affected by variations of potentials which may occur in the thermal-type flowmeter 1 and/or the fuel injection control unit 2.

Next referring to FIG. 9 which shows a circuit configuration of another conventional thermal-type flowmeter 1, the flow-rate indicating voltage signal $V_{afs}$ outputted from the amplifier 1a constituting a part of the sensor circuit is applied to the non-inverting input terminal (+) of the operational amplifier 1b, as in the case of the thermal-type flowmeter 1 shown in FIG. 8. The inverting input Terminal C-) of the operational amplifier 1b is connected to an emitter terminal of an NPN-transistor 1c and additionally to one end of a first reference resistor 1e which has the other end connected to the ground potential. The collector terminal of the NPN-transistor 1c is connected to a reference voltage $V_{cc}$ of a power supply circuit 1d by way of a first current detecting resistor 1f.

A voltage $V_2$ making appearance across the first current detecting resistor 1f as a voltage drop is applied to a non-inverting input terminal of an operational amplifier 1g which has a non-inverting input terminal connected to a junction between the collector terminal of the NPN-transistor 1c and a first current detecting resistor 1f, and an output terminal connected to the base of a PNP-transistor 1h. Further, the inverting input terminal of the operational amplifier 1g is connected to an emitter of the PNP-transistor 1h.

The emitter electrode of the PNP-transistor 1h is connected to the reference voltage $V_{cc}$ of the power supply circuit 1d by way of a second reference resistor $R_e$ while the collector electrode of the PNP-transistor 1h is connected to an analogue input terminal of an A/D converter incorporated in a fuel injection control unit 2, wherein the analogue input terminal is connected to a ground potential terminal of the A/D converter by way of a second current detecting resistor $R_c$. Owing to the circuit arrangement described above, the flow-rate indicating voltage signal $V_{afs}$ can be generated ultimately as a voltage drop $V_c$ making appearance across the second current detecting resistor $R_c$. The voltage signal $V_c$ is inputted to the A/D converter.

In operation, the current which flows through the NPN-transistor 1c and which bears a proportional relation to the output voltage of the operational amplifier 1b undergoes a current-to-voltage conversion (also referred to as the I/V conversion) through the first current detecting resistor $1f$ connected to the collector terminal of the NPN-transistor $1c$. Thus, inputted to the non-inverting input terminal of the operational amplifier $1g$ is a detection voltage $V_2$ resulting from subtraction of a voltage derived from the reference voltage $V_{cc}$ through the I/V conversion, i.e., $$V_2 = V_{cc} - I \cdot 1f.$$

Further, a voltage generated across the second reference resistor $R_e$ is fed back to the inverting input terminal of the operational amplifier $1g$. Accordingly, the detection voltage $V_2$ can assume a value or level which is in proportion to the level of the flow-rate indicating voltage signal $V_{afs}$.

More specifically, the output voltage of the operational amplifier $1g$ which is in proportion to the detection voltage $V_2$, is applied to the base electrode of the PNP-transistor $1h$. As a result of this, an emitter current $I_e$ flows through the second reference resistor $R_e$ with the emitter voltage $V_3$ making appearance across the second reference resistor $R_e$, wherein the electric potential $V_3$ is fed back to the inverting input terminal of the operational amplifier $1g$. Thus, the collector current $I_c$ which bears a proportional relation to the flow-rate indicating voltage signal $V_{afs}$ is ultimately applied to the analogue input terminal of the A/D converter of the fuel injection control unit 2.

In both of the conventional thermal-type flowmeters described above, the analogue input terminal of the analogue-to-digital converter is connected to the ground potential through the second current detecting resistor $R_c$. Consequently, the input voltage to the A/D converter is equivalent to the voltage drop $(I_c \cdot R_c)$ appearing across the second current detecting resistor $R_c$. With the arrangement in which the flow-rate indicating voltage signal $V_{afs}$ is outputted after having been converted to the collector current $I_c$, as described above, the intake air flow signal resulting from the voltage/current conversion can be transmitted to the A/D converter with high fidelity without being affected by variations in potential which may occur in the thermal-type flowmeter 1 and/or the fuel injection control unit 2. Besides, there arises no need for providing a reference potential source in the fuel injection control unit 2.

As can be understood from the foregoing, in the conventional thermal-type flowmeters for the fuel injection control unit, the flow-rate indicating voltage signal undergoes the voltage-to-current conversion with reference to the reference voltage $V_{ref}$. Accordingly, the reference voltage $V_{ref}$ has to be set at a high potential level. Besides, the voltage signal resulting from the current-to-voltage conversion through the second current detecting resistor $R_c$ and inputted to the analogue input terminal of the analogue-to-digital converter has no compatibility or exchangeability with the output voltage with reference to the ground potential.

On the other hand, in the case of the thermal-type flowmeter 1 shown in FIG. 9, the reference voltage has to be set at a high potential, as can be seen from the characteristic diagram shown in FIG. 10. Furthermore, when the flow-rate indicating voltage signal is at a low potential level, the input potential for the operational amplifier becomes high. Consequently, the input circuitry for the operational amplifier has to be necessarily implemented with the NPN-transistor circuitry which is capable of inputting a high potential without being affected by the base-emitter current of the transistor.

Such being the circumstances, when the input circuitry of the other operational amplifier is implemented in the PNP-structure, two different types of operational amplifiers have to be employed, which means that not only limitation is imposed on the degree of freedom in design but also manufacturing cost will be increased. Additionally, because the reference voltage is set high, the power supply source of high potential level has to be employed, which in turn means that limitation is imposed on the selection of the power supply source to be employed, giving rise to problem.

SUMMARY OF THE INVENTION

In the light of the state of the art described above, it is an object of the present invention to provide a thermal-type flowmeter which can avoid the problems mentioned above and which can be realized inexpensively in a miniaturized structure while ensuring operation of high fidelity or accuracy even with a power supply source of a relatively low capacity.

In view of the above and other objects which will become apparent as the description proceeds, there is provided according to a general aspect of the present invention a thermal-type flowmeter for detecting a flow rate of a fluid, which includes a voltage converting means for converting a flow-rate indicating voltage signal outputted from a flow-rate detecting means into a voltage of a level falling within a predetermined range, a voltage-to-current converting means for converting the above-mentioned voltage into a current of magnitude proportional to a value of the flow-rate indicating voltage signal, a current-to-voltage converting means for converting the current into a voltage signal for analogue-to-digital conversion, and a voltage adjusting means for increasing or decreasing output of the voltage converting means in dependence on the value of the flow-rate indicating voltage signal.

By virtue of the arrangement of the thermal-type flowmeter described above, stabilized voltage-to-current conversion can be achieved independent of the value or level of the flow-rate indicating voltage signal.

In a preferred mode for carrying out the invention, the voltage converting means may be so designed as to include a gain adjusting means for changing amplification factor for the flow-rate indicating voltage signal inputted to the voltage converting means.

With to the arrangement of the thermal-type flowmeter described above, stabilized voltage-to-current conversion can be achieved nevertheless of variation of independent of the value or level of the flow-rate indicating voltage signal.

In another preferred mode for carrying out the invention, the voltage adjusting means may be constituted by a series circuit of a resistor or resistors, a diode or diodes, a Zener diode or combinations thereof.

With the arrangement of the thermal-type flowmeter, the voltage adjusting means can be realized inexpensively, to an advantageous effect.

In yet another preferred mode for carrying out the invention, the thermal-type flowmeter may further include a current adjusting means provided in association with a current output part of the voltage-to-current converting means for adjusting a current value of the current output part.

Owing to the circuit arrangement described above, dispersion of the output current brought about by dispersion of circuit constants can be canceled out satisfactorily, whereby stabilized current-to-voltage conversion can be ensured.

In still another preferred mode for carrying out the invention, the current output part may be implemented in the form of a transistor circuitry including two transistors interconnected in the form of a Darlington circuitry.

With the arrangement of the thermal-type flowmeter described above, fluctuation of the base current of the transistor can be suppressed.

In a further preferred mode for carrying out the invention, the current adjusting means may include a constant current circuit for adding a constant source current to the output current at a low-voltage side of the current output part.

Owing to the circuit arrangement of the thermal-type flowmeter described above, stabilized output signal can be obtained without being affected by the gain of the transistor circuit.

In a yet further preferred mode for carrying out the invention, the current adjusting means may include a constant current circuit for adding a constant sink current to the output current at a high-voltage side of the current output part.

With the circuit arrangement of the thermal-type flowmeter described above, stabilized output signal can be obtained without being affected by the gain of the transistor circuit.

In a still further preferred mode for carrying out the invention, the voltage converting means may be so designed as to convert the flow-rate indicating voltage signal into a voltage of the level falling within the predetermined range after effecting current amplification of the flow-rate indicating voltage signal.

With the arrangement of the thermal-type flowmeter described above, the current consumption of the voltage converting means can be diminished, to a further advantage.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 10 is a view for graphically illustrating input/output relation in the thermal-type flowmeter shown in FIG. 9.

DESCRIPTION OF THE PREFERRED EMBODIMENTS

Figure 1:
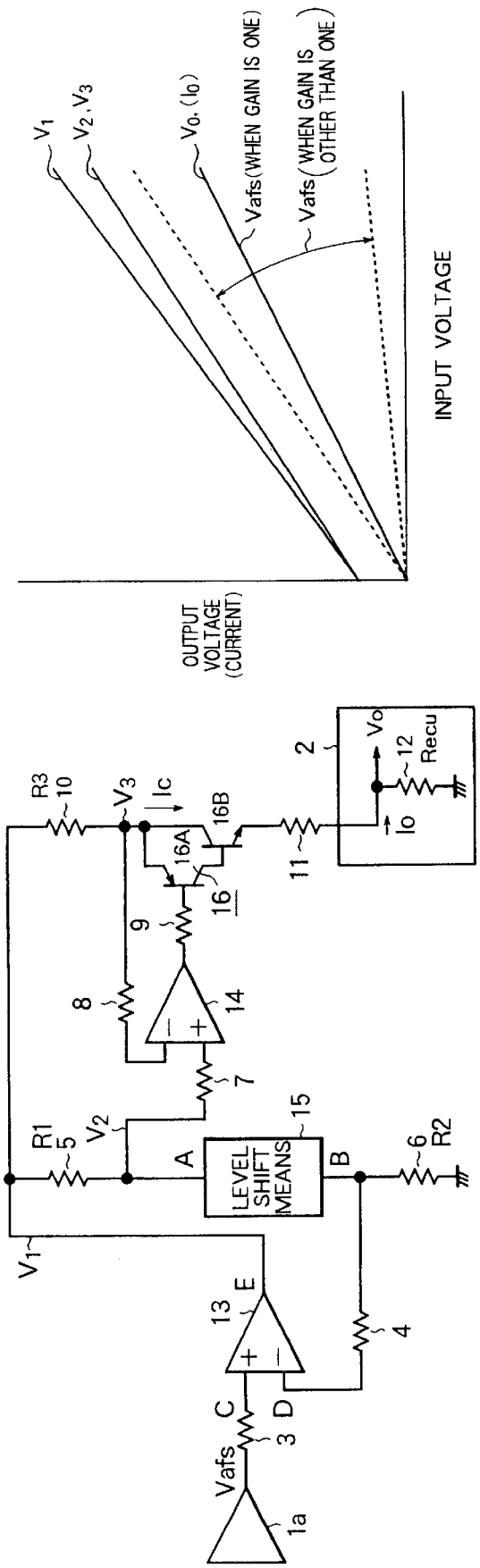
FIG. 1A is a circuit diagram showing a circuit configuration of a thermal-type flowmeter according to first and third embodiment of the present invention.
FIG. 1B is a view for graphically illustrating input/output relation in a thermal-type flowmeter according to the first embodiment of the invention.

The present invention will be described in detail in conjunction with what is presently considered as preferred or typical embodiments thereof by reference to the drawings. In the following description, like reference characters designate like or corresponding parts throughout the several views. Further, in the following description, it will be assumed only for convenience of description that the circuit device according to the input voltage is applied to a flow-rate sensor which is installed in an intake pipe in an internal combustion engine for detecting a flow rate of air fed to the engine.

Embodiment 1

FIG. 1A is a circuit diagram showing a circuit configuration of a thermal-type flowmeter according to a first embodiment of the present invention. Referring to the figure, an amplifier 1a is provided at an output stage of an air flow sensor circuit (not shown) for outputting a flow-rate indicating voltage signal $V_{afs}$ which is applied to a non-inverting input terminal of a first operational amplifier 13 by way of an input resistor 3. A serial connection of a first current detecting resistor 5, a level shift circuit 15 and a first reference resistor 6 having a resistance value $R_2$ is inserted between an output terminal of the first operational amplifier 13 and the ground potential. A junction B between the level shift circuit 15 and the first reference resistor 6 is connected to an inverting input terminal of the first operational amplifier 13 by way of a feedback resistor 4.

A second operational amplifier 14 has a non-inverting input terminal connected to a junction A between the first current detecting resistor 5 having a resistance value $R_1$ and the level shift circuit 15 by way of an input resistor 7. The output terminal of the second operational amplifier 14 is connected to a base of a PNP-transistor 16A by way of a resistor 9. The PNP-transistor 16A is combined with a NPN-transistor 16B in Darlington connection. Hereinafter, this combination will also be referred to as the Darlington transistor circuitry denoted by a reference numeral 16. The collector of the NPN-resistor 16B of the Darlington transistor circuitry 16 is connected to an inverting input terminal of the second operational amplifier 14 by way of a feedback resistor 8 and additionally connected to an output terminal of the first operational amplifier 13 by way of a second reference resistor 10 having a resistance value $R_3$.

The emitter of the NPN-transistor 16B is connected to the input terminal of an A/D converter (not shown) incorporated in the fuel injection control unit 2. A second current detecting resistor 12 having a resistance value $R_{ecu}$ is connected between the above-mentioned input terminal and the ground potential. Parenthetically, it should be added that the Darlington connection of the PNP-transistor 16A and the NPN-transistor 16B is effective for stabilizing the transistor base current.

By providing the level shift circuit 15, the output voltage $V_1$ of the first operational amplifier 13 which serves as the voltage supply for the voltage-to-current conversion circuit constituted by the first current detecting resistor 5 having the resistance value $R_1$, the level shift circuit 15 and the first reference resistor 6 having the resistance value $R_2$ can be increased monotonously in dependence on the input voltage which is flow-rate indicating voltage signal $V_{afs}$ as is illustrated in FIG. 1B. The output current $I_o$ outputted from the NPN-transistor 16B of the Darlington transistor circuitry 16 undergoes current-to-voltage conversion through the second current detecting resistor 12 before being inputted to the A/D converter. In this manner, the air flow rate information can be transmitted to the fuel injection control unit 2 in the form of the current signal.

The circuit configuration of the thermal-type flowmeter according to the instant embodiment of the invention is so designed as to lower the input voltage level for the second operational amplifier 14 employed at the current output stage with a view to ensuring the input voltage range for the second operational amplifier 14 of the PNP-input transistor type. More specifically, the voltage $(V_1-V_2)$ appearing across the first current detecting resistor 5 can be given by the following expression (1):

$$(V_1-V_2)=(R_1/R_2) \times V_{afs} \qquad (1)$$

where $V_1$ represents a voltage making appearance at a junction between the first current detecting resistor 5 and the second reference resistor 10, $V_2$ represents a voltage at the junction A, and $V_3$ represents an emitter voltage of the PNP-transistor 16A.

Since $(V_1-V_2)=(V_1-V_3)$, the collector current $I_c$ of the NPN-transistor 16B of the Darlington transistor circuitry 16 can be given by the following expression (2).

$$\begin{aligned} I_c &= (V_1 - V_3)/R_3 \\ &= \{(R_1/R_2)/R_3\} \times V_{afs} \end{aligned} \qquad (2)$$

In the above expressions (1) and (2), $R_1$ represents the resistance value of the first current detecting resistor 5, $R_2$ represents that of the first reference resistor 6, and $R_3$ represents that of the second current detecting resistor 10.

Since the collector current $I_c$ is equal the output current $I_o$, the input voltage $V_o$ applied to the A/D converter can be given by the following expression (3).

$$V_o=\{(R_1 \times R_{ecu})/R_2 \times R_3\} \times V_{afs} \qquad (3)$$

Next, description will be directed to the range of the input voltages ($V_1$, $V_2$) of the second operational amplifier 14. The input voltage range of the second operational amplifier 14 is determined as a sum of the flow-rate indicating voltage signal $V_{afs}$ and the shift voltage generated by the level shift circuit 15. By way of example, in case the level shift circuit 15 is implemented in the form of a series connection of a resistor 17 of the resistance value $R_4$ and two diodes 18 (not shown in FIG. 1 but shown in FIG. 3), a voltage $2V_f$ (see FIG. 3) makes appearance a cross the series connection of diodes 18. Thus, the potential $V_2$ (=$V_3$) can be given by the following expression (4):

$$V_2=\{(R_2+R_4)/R_2\} \times V_{afs}+2V_f \qquad (4)$$

In that case, the potential of the input voltage $V_1$ can be given by the following expression (5):

$$V_1\{(R_1+R_2+R_4)/R_2\} \times V_{afs}+2V_f \qquad (5)$$

Figure 8:
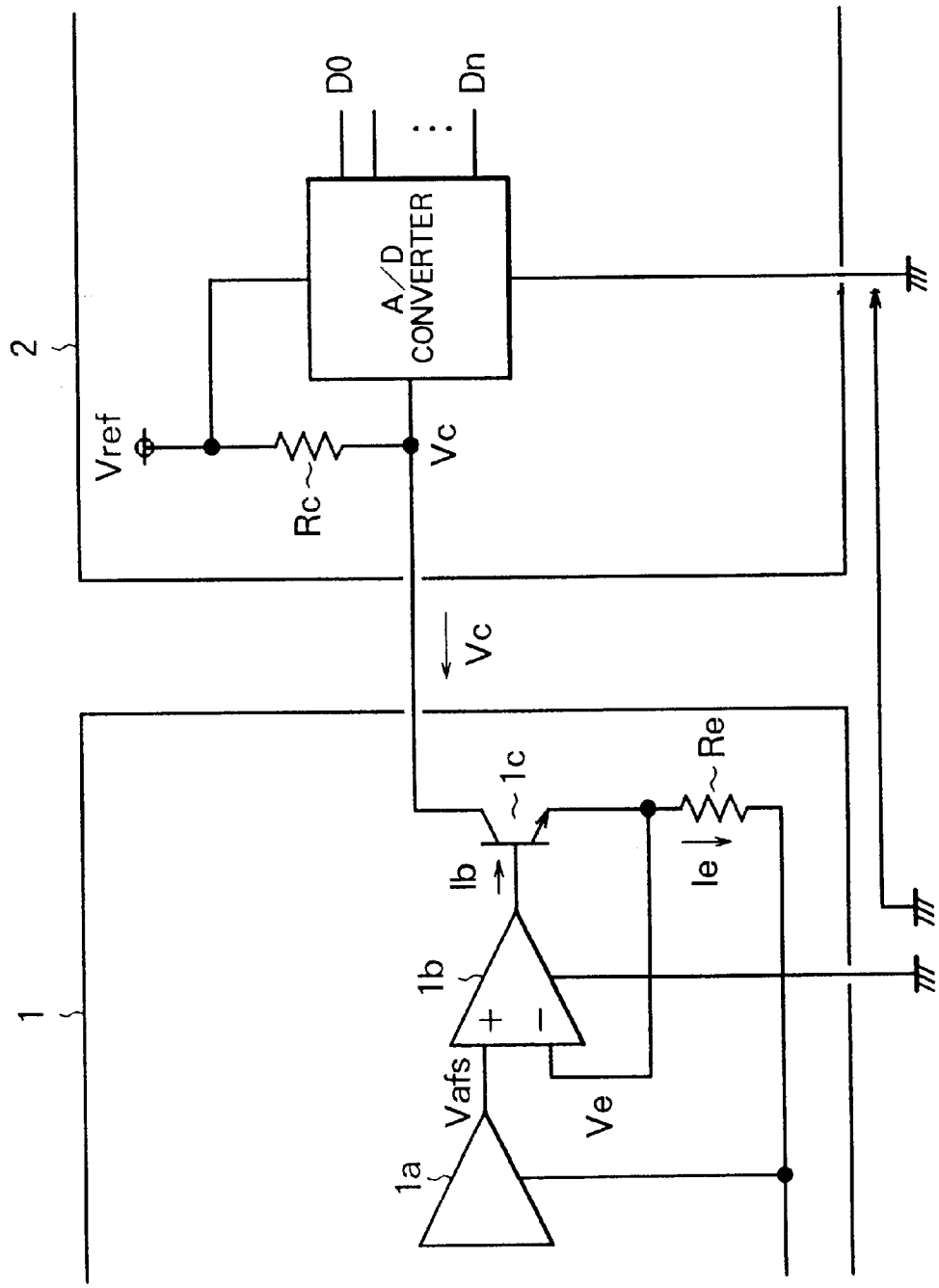
FIG. 8 is a circuit diagram showing a circuit configuration of a conventional thermal-type flowmeter.
Figure 9:
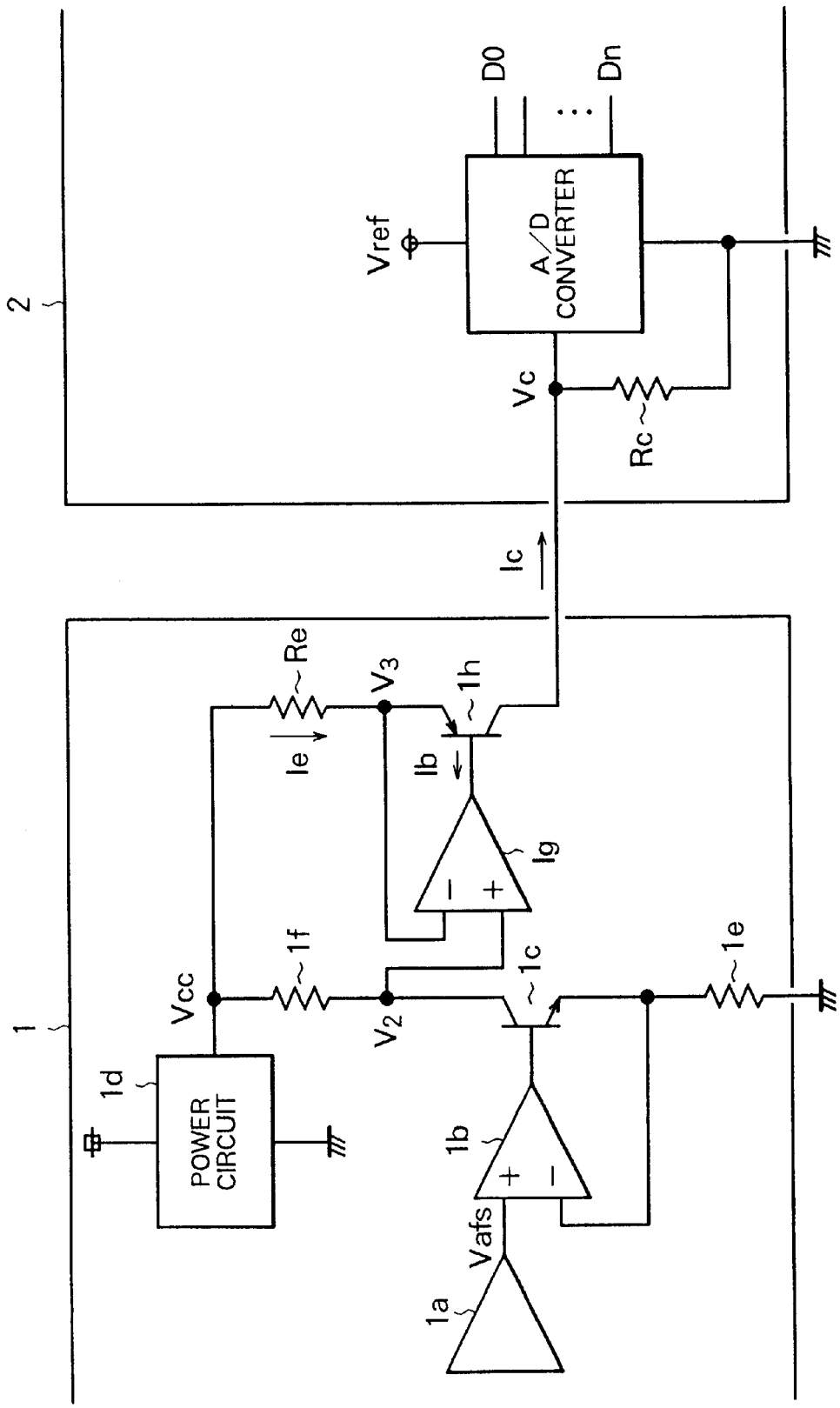
FIG. 9 is a circuit diagram showing another conventional thermal-type flowmeter.

As is illustrated in FIG. 10, the potential within the input voltage range of the second operational amplifier 14 becomes low and can fall within the range of the input voltage for the PNP input-type operational amplifier whose input range is of zero to −1.5 volts which is source voltage for the operational amplifier. In this manner, the input voltage range of the second operational amplifier 14 can be set rather arbitrarily, which in turn means that the input dynamic range of the second operational amplifier 14 can be enlarged, to an advantage. Additionally, the circuit for the reference voltage $V_{ref}$ provided in the conventional fuel injection control unit 2 shown in FIG. 8 can be spared, to another advantage.

Embodiment 2

Figure 2:
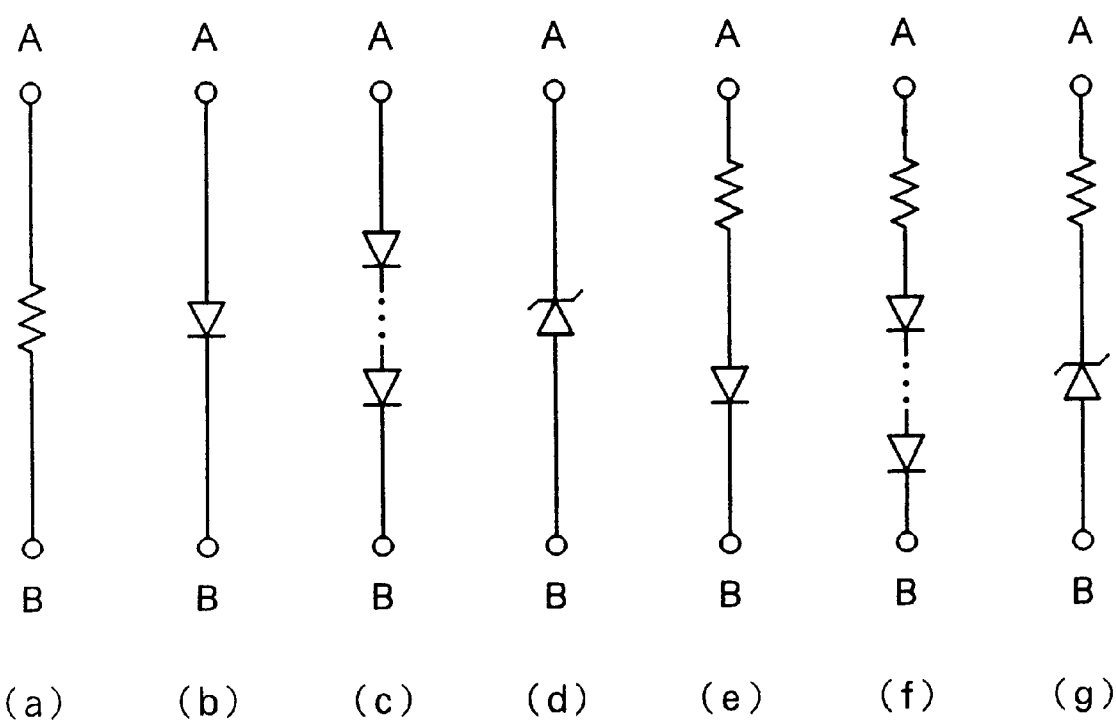
FIG. 2a–2g is a view showing exemplary circuit configurations of a level shift circuit employed in the thermal-type flowmeter according to a second embodiment of the present invention.

A second embodiment of the present invention is directed to circuit configurations of the level shift circuit 15. FIG. 2 shows exemplary circuit configurations of the level shift circuit 15. The level shift circuit 15 has a function for allowing the Darlington transistor circuitry 16 to operate in an active range and can be implemented in the form of a resistor, a diode, a series connection of diodes, a Zener diode or combinations thereof, as shown at (a) to (g) of FIG. 2, respectively, in dependence on the characteristics of the PNP-transistor 16A and the NPN-transistor 16B, the input voltage range of the flow-rate indicating voltage signal $V_{afs}$ and the range of the output voltage $V_o$. By incorporating the suitable one of the level shift circuits 15 shown in FIG. 2, it is possible to operate the Darlington transistor circuitry 16 in the active range.

Embodiment 3

Since the flow-rate indicating voltage signal $V_{afs}$ may generally differ from one to another sensor element, it is preferred to regulate the output current $I_o$ to a predetermined standard range. A third embodiment of the invention is directed to a means for adjusting the output current $I_o$ within a predetermined standardized range. To this end, in the thermal-type flowmeter according to the instant embodiment of the present invention, the first reference resistor 6 of resistance value $R_2$ is implemented as a variable resistor so that it can serve as an adjusting means. Further, gain constants of first current signal $V_{afs1}$ and second current signal $V_{afs2}$ may be weighted with constants $R_{G1}, \ldots, R_{G4}$ in accordance with the expression (8) described later on.

As is apparent from the expression (2) mentioned hereinbefore, the adjusting means may be realized by using a variable resistor as the first current detecting resistor 5 or the second reference resistor 10. Owing to the gain function of the voltage-to-current converting means constituted by the second operational amplifier 14 and the Darlington transistor circuitry 16, error component which may be brought about by the circuit components can be reduced. Besides, the circuit can be miniaturized inexpensively.

Embodiment 4

Figure 3:
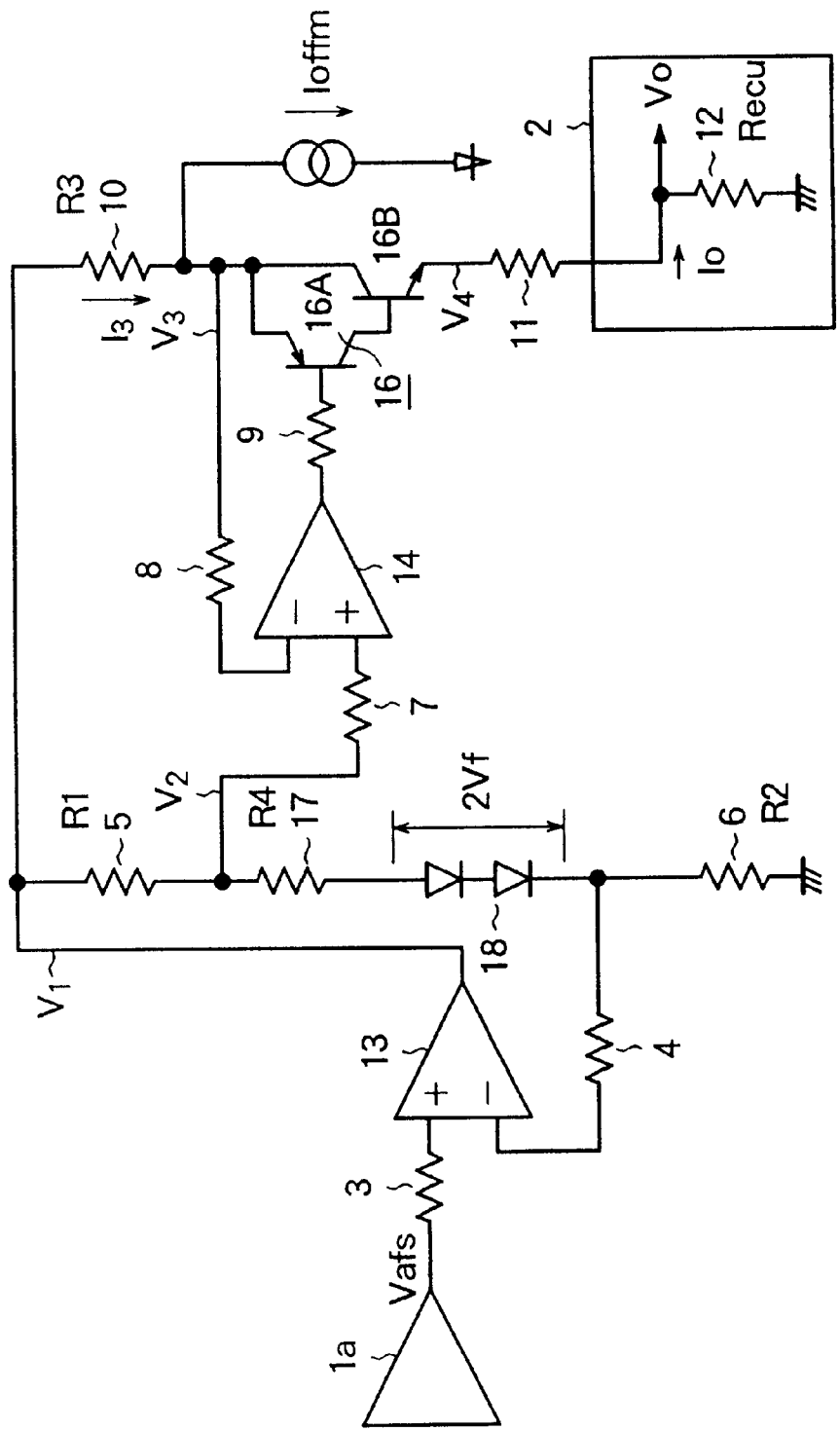
FIG. 3 is a circuit diagram showing a circuit configuration of a thermal-type flowmeter according to a fourth embodiment of the present invention.

FIG. 3 is a circuit diagram showing a circuit configuration of the thermal-type flowmeter according to a fourth embodiment of the present invention. The output current $I_o$ may vary due to dispersion of the resistance value of the second reference resistor 10 of resistance value $R_3$. With the instant embodiment of the invention, it is contemplated to adjust such output current $I_o$ so that it can assume a predetermined standard value or falls within a predetermined standard range.

To this end, a constant sink current $I_{offm}$ is subtracted from the current $I_3$ flowing through the second reference resistor 10 of the resistance value $R_3$ to cancel out positive or negative offset of the output current $I_o$. In this manner, the output current $I_o$ can be regulated so that it assumes a predetermined standard value or falls within a predetermined standard range.

In this conjunction, the constant current circuit for generating the constant sink current $I_{offm}$ should preferably be provided in the vicinity of the collector of the Darlington transistor circuitry 16 at which a relatively high electric potential $V_3$ makes appearance, because then the reference potential for the constant current circuit can be set at a low potential level and thus the constant current circuit can be implemented easily and inexpensively.

Embodiment 5

In the case of the thermal-type flowmeter according to the fourth embodiment, the connecting point of the constant current circuit is provided in the vicinity of the collector of the Darlington transistor circuitry 16 at which the voltage $V_3$ of a relatively high potential makes appearance. However, the constant current circuit can be provided in the vicinity of a circuit point at which a voltage $V_4$ of relatively low potential makes appearance. In that case, offset regulation of the output current $I_o$ for standardizing the flow-rate indicating voltage signal $V_{afs}$ can be carried out at the final output stage, whereby the stable output current $I_o$ can be derived without being affected by the gains of the PNP-transistor 16A and the NPN-transistor 16B.

Figure 4:
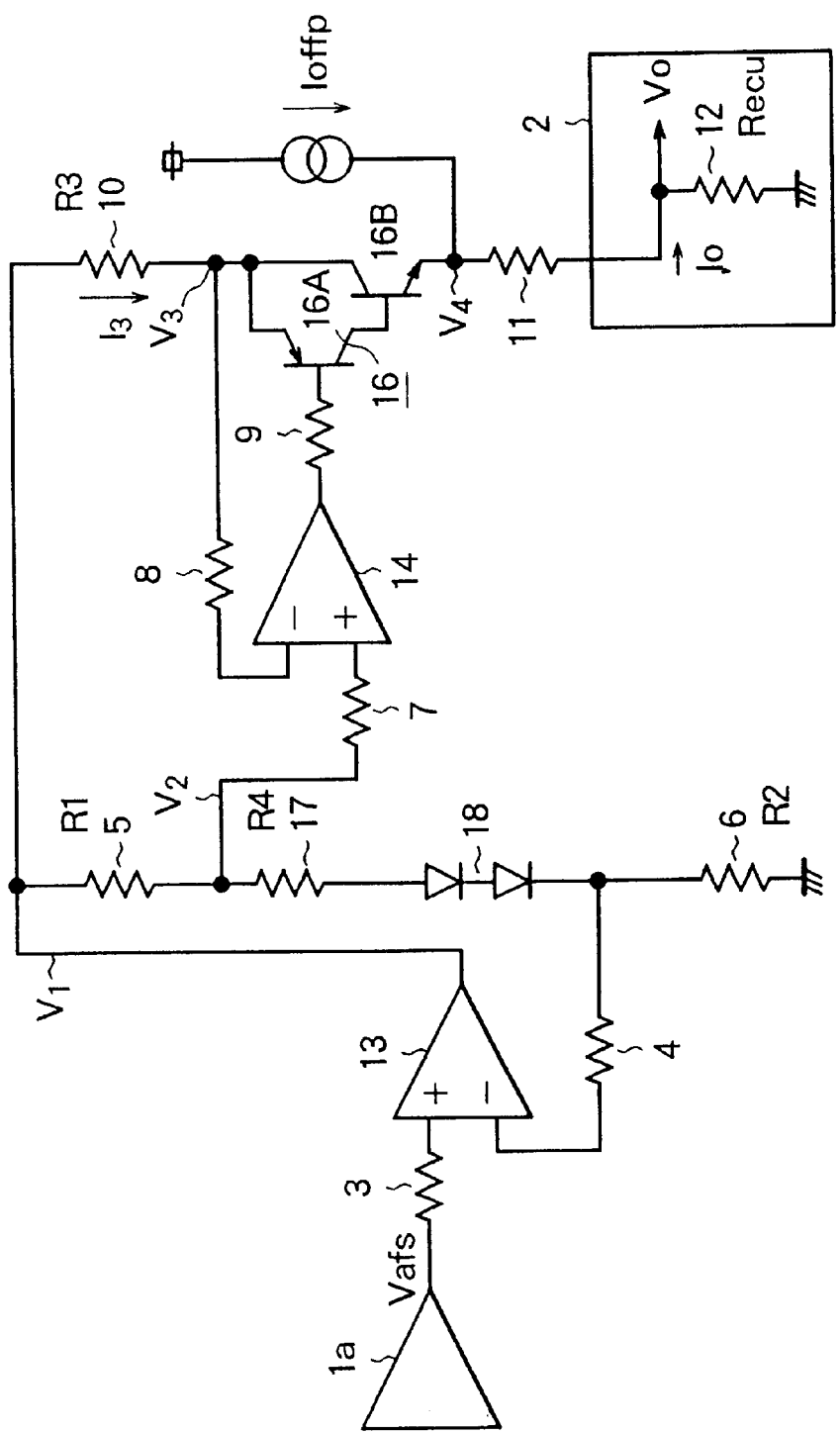
FIG. 4 is a circuit diagram showing a circuit configuration of the thermal-type flowmeter according to a fifth embodiment of the present invention.

FIG. 4 is a circuit diagram showing a circuit configuration of the thermal-type flowmeter according to a fifth embodiment of the present invention. As can be seen in FIG. 4, the constant current circuit designed to output the constant source current $I_{offp}$ is provided in the vicinity of the emitter of the NPN-transistor 16B of the Darlington transistor circuitry 16 at which the voltage $V_4$ of a relatively low potential level makes appearance so that the constant source current $I_{offp}$ can be added to the emitter current. By virtue of the arrangement mentioned above, positive or negative offset of the output current $I_o$ can be so adjusted that the output current $I_o$ assume to a predetermined standard value or falls within a predetermined range.

Embodiment 6

Figure 5B:
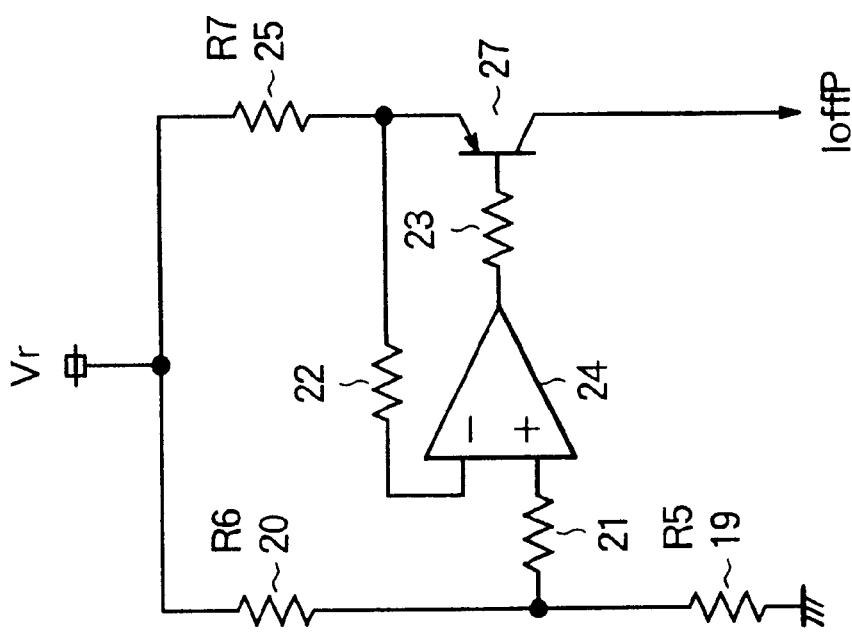
FIG. 5B is a circuit diagram showing a circuit configuration of a constant current circuit for generating a constant source current in the thermal-type flowmeter according to a seventh embodiment of the present invention.
Figure 5A:
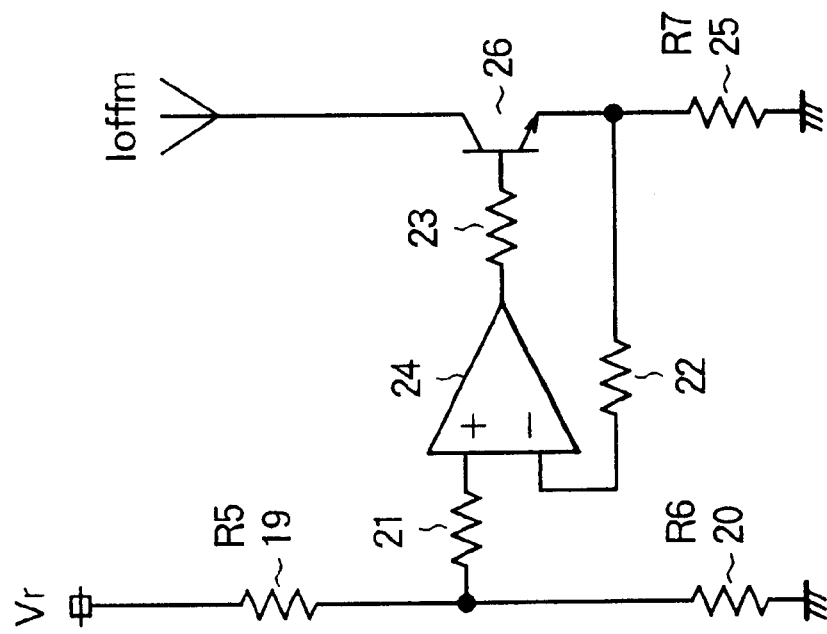
FIG. 5A is a circuit diagram showing a circuit configuration of a constant current circuit for generating a constant sink current in the thermal-type flowmeter according to a sixth embodiment of the present invention.

A sixth embodiment of the present invention is directed to a circuit structure of the constant current circuit for generating the constant sink current $I_{offm}$ FIG. 5A shows a circuit configuration of the constant current circuit for generating the constant sink current $I_{offm}$ according to the sixth embodiment of the invention. Referring to the figure, a third operational amplifier 24 has a non-inverting input terminal connected to a junction between a voltage dividing resistor 19 of resistance value $R_5$ and a voltage dividing resistor 20 of resistance value $R_6$ which are connected in series between a reference voltage terminal $V_r$ and the ground potential. An input resistor 21 is interposed between the above-mentioned junction and the non-inverting input terminal of the third operational amplifier 24. The output terminal of the third operational amplifier 24 is connected to the base of an NPN-transistor 26 by way of a resistor 23. The emitter of the NPN-transistor 26 is connected to the inverting input terminal of the third operational amplifier 24 by way of a feedback resistor 22 and additionally connected to the ground potential by way of a current adjusting resistor 25 of resistance value $R_7$, wherein the constant sink current $I_{offm}$ to undergo the offset adjustment is inputted to the collector of the NPN-transistor 26.

In operation of the circuit shown in FIG. 5A, when a reference voltage of a predetermined value derived from the voltage division by the voltage dividing resistors 19 ($R_5$) and 20 ($R_6$) is inputted to the non-inverting input terminal of the third operational amplifier 24, the emitter voltage of the NPN-transistor 26 is fed back to the inverting input terminal of the third operational amplifier 24 by way of the feedback resistor 22, as a result of which the emitter voltage becomes equal to the reference voltage derived from the voltage division. Thus, by adjusting the resistance value $R_7$ of the current adjusting resistor 25, the constant sink current $I_{offm}$ can be regulated, as can be seen from the following expression (6):

$$I_{offm} = \{R_6/(R_5+R_6)\} \times V_r \times (1/R_7) \tag{6}$$

By using the current adjusting resistor 25 of the resistance value $R_7$ as the adjusting means, it is possible to set the constant sink current $I_{offm}$ at a desired value. Since the offset adjustment can be achieved only with the current adjusting resistor 25 ($R_7$), the latter may be mounted as an external element when the constant current circuit is to be implemented as an integrated circuit. In that case, the number of pins of the integrated circuit can be decreased.

Embodiment 7

A seventh embodiment of the present invention is directed to a circuit structure of the constant current circuit for generating the constant source current $I_{offp}$. FIG. 5B shows a circuit configuration of the constant current circuit for generating the constant source current $I_{offp}$ according to the seventh embodiment of the invention. Referring to the figure, the third operational amplifier 24 has a non-inverting input terminal connected to a junction between a voltage dividing resistor 19 of resistance value $R_5$ and a voltage dividing resistor 20 of resistance value $R_6$ which are connected in series between a reference voltage terminal $V_r$ and the ground potential. An input resistor 21 is interposed between the above-mentioned junction and the non-inverting input terminal of the third operational amplifier 24. The output terminal of the third operational amplifier 24 is connected to the base of a PNP-transistor 27 by way of a resistor 23. The emitter of the PNP-transistor 27 is connected to the inverting input terminal of the third operational amplifier 24 by way of a feedback resistor 22 and additionally connected to a terminal of a reference voltage $V_r$ by way of a current adjusting resistor 25 of the resistance value $R_7$, wherein the constant source current $I_{offp}$ after having regulated is outputted from the collector of the PNP-transistor 27.

In operation of the circuit shown in FIG. 5B, when a reference voltage of a predetermined value derived from the voltage division through the voltage dividing resistors 19 ($R_5$) and 20 ($R_6$) is inputted to the non-inverting input terminal of the third operational amplifier 24, the emitter voltage of the PNP-transistor 27 is fed back to the inverting input terminal of the third operational amplifier 24 by way of the feedback resistor 22, as a result of which the emitter voltage becomes equal to the reference voltage derived from the voltage division. Thus, by adjusting the resistance value $R_7$ of the current adjusting resistor 25, the constant source current $I_{offp}$ can be regulated in accordance with the following expression (7):

$$I_{offp} = \{R_6/(R_5+R_6)\} \times V_r \times (1/R_7) \tag{7}$$

By using the resistance value $R_7$ as the adjusting means, it is possible to set the constant source current $I_{offp}$ at a desired value. Since the offset adjustment can be achieved only with the current adjusting resistor 25 ($R_7$), the latter may be mounted as an external element when the constant current circuit is to be implemented as an integrated circuit. In that case, the number of pins of the integrated circuit can be decreased.

The constant current circuits shown in FIGS. 5A and 5B, respectively, differ from each other only in respect to the reference voltage, i.e., reference voltage $V_r$ and the ground potential, and the transistor type employed. Accordingly, so long as the offset adjustment is not carried out concurrently in both of negative and positive directions in the constant current circuits shown in FIGS. 5A and 5B, respectively, both the constant current circuits for generating the constant sink current $I_{offm}$ and the constant source current $I_{offp}$ can be realized in a same structure by using the same operational amplifiers as the operational amplifiers 24, respectively, as well as same peripheral resistors simply by exchanging the reference voltage $V_r$ to the ground potential or vice versa and exchanging the NPN-transistor 26 with the PNP-transistor 27 or vice versa.

In other words, the constant current circuit of a substantially same structure except for the differences mentioned above can be used for generating the constant sink current $I_{offm}$ or the constant source current $I_{offp}$. Further, in practical applications, the sink current and the source current are not generated concurrently. Thus, both circuits shown in FIGS. 5A and 5B can be implemented in a common structure, whereby the number of the circuit components of the thermal-type flowmeter can be decreased correspondingly. Thus the thermal-type flowmeter can be realized inexpensively in a miniaturized structure.

Embodiment 8

Figure 6C:
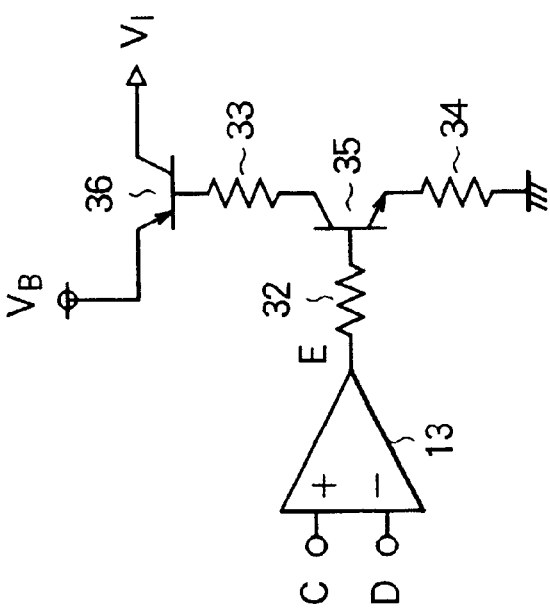
FIG. 6C is a circuit diagram showing another exemplary circuit configuration of the output circuit for the operational amplifier according to the eighth embodiment of the invention.
Figure 6B:
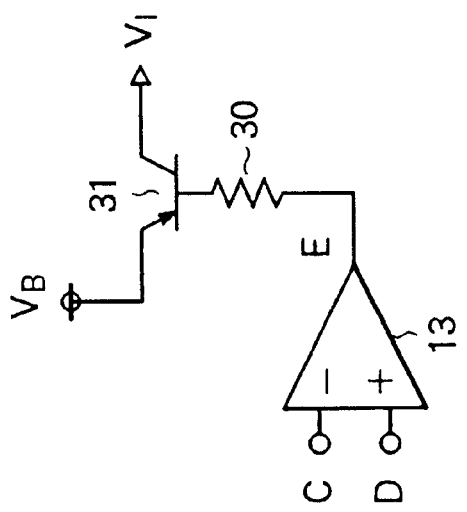
FIG. 6B is a circuit diagram showing another exemplary circuit configuration of the output circuit for the operational amplifier according to the eighth embodiment of the invention.
Figure 6A:
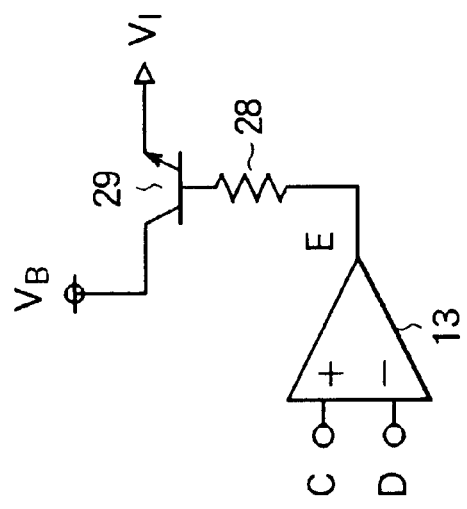
FIG. 6A, is a circuit diagram showing an exemplary circuit configuration of an output circuit for an operational amplifier according to an eighth embodiment of the invention.

An eighth embodiment of the invention is directed to the output circuit for the first operational amplifier 13 which is designed for amplifying the output currents of the first operational amplifier 13 by using a transistor. FIGS. 6A, 6B and 6C are circuit diagrams showing exemplary circuit configurations of the output circuit for the first operational amplifier 13 according to the eighth embodiment of the invention. By implementing the output circuit in a current amplifying configuration, current consumption of the first operational amplifier 13 can be reduced.

Referring to FIG. 6A, a transistor 29 of NPN type has a base to which the output voltage of the first operational amplifier 13 is applied by way of a resistor 28, while the collector of the transistor 29 is applied with a constant voltage of a level $V_B$, wherein a voltage $V_1$ is outputted from the emitter of the transistor 29 as the output voltage of the first operational amplifier 13. By virtue of the output circuit mentioned above, the range of the voltage $V_1$ can be extended close to the voltage level $V_B$.

Referring to FIG. 6B, a transistor 31 of PNP type has a base to which the output voltage of the first operational amplifier 13 is applied by way of a resistor 30, while the emitter of the transistor 31 is applied with a constant voltage of a level $V_B$, wherein the voltage $V_1$ is outputted from the collector of the transistor 31 as the output voltage of the first operational amplifier 13. At this juncture, it should be mentioned that when the output circuit shown in FIG. 6B is employed, the flow-rate indicating voltage signal $V_{afs}$ is inputted to the inverting input terminal of the first operational amplifier 13. By virtue of the output circuit mentioned above, the range of the voltage $V_1$ can be extended close to the voltage level $V_B$.

FIG. 6C is a circuit diagram showing another circuit configuration of the output circuit. As can be seen in the figure, this output circuit includes an NPN-transistor 35 which has an emitter connected to the ground potential by way of a resistor 34, a base connected to the output terminal of the first operational amplifier 13 by way of a resistor 32 and a collector connected to a base of a PNP-transistor 36 by way of a resistor 33. Because the base current of the PNP-transistor 36 can be controlled by the NPN-transistor 35, the output range of the first operational amplifier 13 can be set arbitrarily.

Embodiment 9

Figure 7:
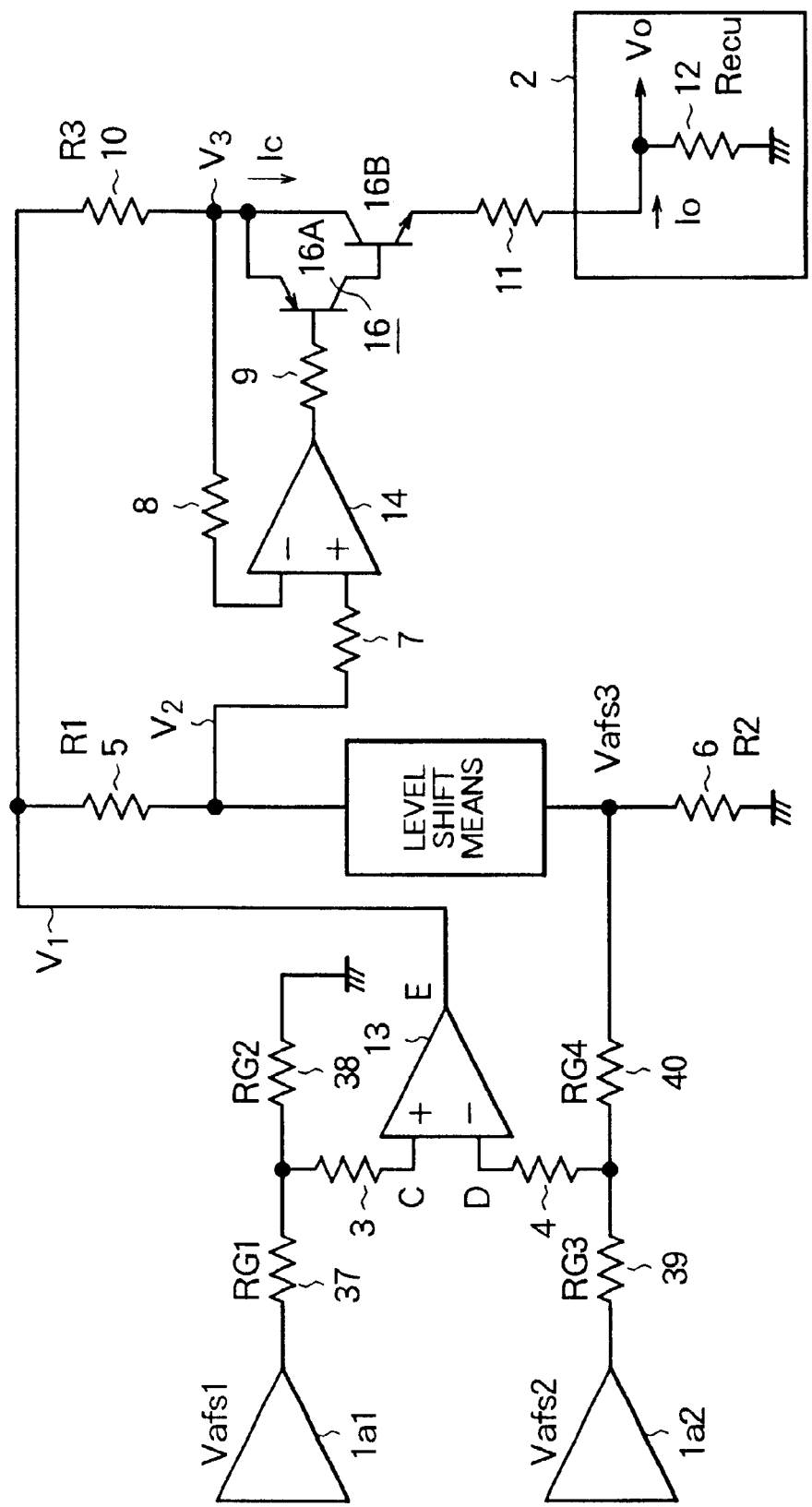
FIG. 7 is a circuit diagram showing a circuit configuration of a thermal-type flowmeter according to a ninth embodiment of the present invention.

A ninth embodiment of the present invention is directed to a thermal-type flowmeter in which differential input derived from two current signals $V_{afs1}$ and $V_{afs2}$ is amplified. FIG. 7 is a circuit diagram showing a circuit configuration of the thermal-type flowmeter according to the ninth embodiment of the invention, in which circuit components same as or equivalent to those shown in FIG. 1 are denoted by like reference characters. Referring to the figure, the thermal-type flowmeter now under consideration includes a first amplifier 1a1 for generating a first current signal $V_{afs1}$ and a second amplifier 1a2 for generating a second current signal $V_{afs2}$. Resistors 37, 38, 39 and 40 are used for determining the differential amplification gain of the first operational amplifier 13.

Relation among the current signals $V_{afs1}$, $V_{afs2}$ and $V_{afs3}$ can be given by the following expression (8):

$$V_{afs3} = \{R_{G2}/(R_{G1}+R_{G2})\} \times \{(R_{G3}+R_{G4})/R_{G3}\} \times V_{afs1} - (R_{G4}/R_{G3}) \times V_{afs2} \tag{8}$$

In the above expression, $V_{afs3}$ represents a voltage appearing at the junction between the level shift circuit 15 and the first reference resistor 6, and $R_{G1}$, $R_{G2}$, $R_{G3}$ and $R_{G4}$ represent resistance values of the resistors 37, 38, 39 and 40, respectively.

In particular, when $R_{G1}=R_{G3}$, being represented generally by $R_s$ and when $R_{G2}=R_{G4}$, being represented generally by $R_f$, the expression (8) can be rewritten as follows:

$$V_{afs3} = (R_f/R_s) \times (V_{afs1}-V_{afs2}) \tag{9}$$

By substituting the third current signal $V_{afs3}$ for the flow-rate indicating voltage signal $V_{afs}$, the output of the thermal-type flowmeter according to the instant embodiment of the invention can be determined similarly to the case of the thermal-type flowmeter according to the first embodiment.

Furthermore, when the input to the first operational amplifier 13 is differential, there can be obtained advantageous effects mentioned hereinbefore in conjunction with the first, third and fourth embodiment of the invention.

Many features and advantages of the present invention are apparent form the detailed specification and thus it is intended by the appended claims to cover all such features and advantages of the apparatus which fall within the true spirit and scope of the invention. Further, since numerous modifications and changes will readily occur to those skilled in the art, it is not desired to limit the invention to the exact constructions and operations illustrated and described.

By way of example, although it has been assumed in the foregoing description that the thermal-type flowmeter according to the present invention is applied to measurement of intake air flow rate in the internal combustion engine, it goes without saying that the thermal-type flowmeter according to the invention can find many other various applications.

Accordingly, all suitable modifications and equivalents may be resorted to, falling within the scope of the invention.

What is claimed is:

1. A thermal-type flowmeter for detecting a flow rate of a fluid, comprising:

voltage converting means for converting a flow-rate indicating voltage signal outputted from flow-rate detecting means into a voltage of a level falling within a predetermined range;

voltage-to-current converting means for converting said voltage into a current of magnitude proportional to a value of said flow-rate indicating voltage signal;

current-to-voltage converting means for converting said current into a voltage signal for analogue-to-digital conversion; and voltage adjusting means for increasing or decreasing output of said voltage converting means in dependence on the value of said flow-rate indicating voltage signal.

2. A thermal-type flowmeter according to claim 1, wherein said voltage converting means includes gain adjusting means for changing amplification factor for said flow-rate indicating voltage signal inputted to said voltage converting means.

3. A thermal-type flowmeter according to claim 2, wherein said voltage adjusting means is constituted by one selected from a group consisting of a resistor, resistors, a diode, diodes, a Zener diode and combinations thereof.

4. A thermal-type flowmeter according to claim 1, further comprising:

current adjusting means provided in association with said voltage-to-current converting means, which comprises a current output part, for adjusting a current value of said current output part.

5. A thermal-type flowmeter according to claim 4, wherein said current output part is implemented in the form of a transistor circuitry including two transistors interconnected in the form of a Darlington circuitry.

6. A thermal-type flowmeter according to claim 5, wherein said current adjusting means includes a constant current circuit for adding a constant source current to said output current at a low-voltage side of said current output part.

7. A thermal-type flowmeter according to claim 5, wherein said current adjusting means includes a constant current circuit for adding a constant sink current to said output current at a high-voltage side of said current output part.

8. A thermal-type flowmeter according to claim 1, wherein said voltage converting means converts said flow-rate indicating voltage signal into said voltage of the level falling within said predetermined range after effecting current amplification of said flow-rate indicating voltage signal.

* * * * *